United States Patent
Liu

(10) Patent No.: US 9,073,360 B2
(45) Date of Patent: Jul. 7, 2015

(54) SYSTEMS AND METHODS FOR PRINTING DIFFERENTIAL GLOSS IMAGE ON PACKAGING

(75) Inventor: Chu-heng Liu, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 2 days.

(21) Appl. No.: 13/597,537

(22) Filed: Aug. 29, 2012

(65) Prior Publication Data

US 2014/0063158 A1 Mar. 6, 2014

(51) Int. Cl.

| | |
|---|---|
| B41J 2/435 | (2006.01) |
| B41J 11/00 | (2006.01) |
| B41J 3/407 | (2006.01) |
| B41J 2/44 | (2006.01) |
| B23K 26/08 | (2014.01) |
| B23K 26/00 | (2014.01) |

(52) U.S. Cl.
CPC ............. *B41J 11/002* (2013.01); *B41J 2/442* (2013.01); *B23K 26/0823* (2013.01); *B23K 26/00* (2013.01); *B41J 3/4073* (2013.01)

(58) Field of Classification Search
USPC .................................................. 347/171, 224
See application file for complete search history.

(56) References Cited

U.S. PATENT DOCUMENTS

| | | | | |
|---|---|---|---|---|
| 4,378,564 | A * | 3/1983 | Cross et al. ...................... 347/54 |
| 4,503,437 | A * | 3/1985 | Katzschner ..................... 347/43 |
| 5,184,152 | A * | 2/1993 | French .......................... 347/197 |
| 5,220,356 | A | 6/1993 | Yaginuma |
| 5,369,419 | A * | 11/1994 | Stephenson et al. ............ 347/61 |
| 5,519,426 | A * | 5/1996 | Lukis et al. .................... 347/211 |
| 6,066,829 | A | 5/2000 | Ishikawa |
| 6,958,762 | B2 * | 10/2005 | Franklin ........................ 347/225 |
| 7,046,267 | B2 * | 5/2006 | Franklin et al. ............... 347/248 |
| 7,355,614 | B2 * | 4/2008 | Franklin ........................ 347/225 |
| 7,394,479 | B2 * | 7/2008 | Assa et al. ..................... 347/251 |
| 7,920,279 | B2 | 4/2011 | Ernst et al. |
| 2002/0159785 | A1 | 10/2002 | Masuda et al. |
| 2005/0255406 | A1 * | 11/2005 | Assa .......................... 430/270.1 |
| 2006/0012821 | A1 * | 1/2006 | Franklin et al. ............... 358/1.15 |
| 2007/0288869 | A1 * | 12/2007 | Franklin et al. ............... 715/840 |
| 2008/0101832 | A1 | 5/2008 | Yaoi et al. |
| 2009/0245896 | A1 | 10/2009 | Ishikake et al. |
| 2011/0058869 | A1 | 3/2011 | Kagawa |
| 2011/0262196 | A1 | 10/2011 | Maeda |
| 2012/0039643 | A1 | 2/2012 | Chang et al. |
| 2014/0169849 | A1 * | 6/2014 | Liu ............................... 399/341 |

FOREIGN PATENT DOCUMENTS

| | | | |
|---|---|---|---|
| JP | 61-91678 A | 9/1986 | |
| JP | 2009-058730 | * 3/2009 | ............. G03G 15/00 |

OTHER PUBLICATIONS

Computer-generated translation of JP 2009-058730, published on Mar. 2009.*

(Continued)

*Primary Examiner* — Huan Tran

(74) *Attorney, Agent, or Firm* — Ronald E. Prass, Jr.; PRASS LLP

(57) ABSTRACT

A system for generating a differential gloss image useful for digital printing directly on packaging includes a packaging transport and a laser glossing imager. The packaging transport is configured to position packaging substrate having a printed image to a laser glossing imager. The printed image is formed of toner or ink. The packaging substrate is aligned with respect to the laser glossing imager exposing one or more portions of the printed image to radiation for altering a surface of the one or more portions of the printed image for forming a differential gloss image.

18 Claims, 3 Drawing Sheets

(56) References Cited

OTHER PUBLICATIONS

Chu-heng Liu, U.S. Appl. No. 13/539,416, Office Action dated Dec. 19, 2013.

Chu-heng Liu, U.S. Appl. No. 13/539,421, Office Action dated Aug. 2, 2013.

Chu-heng Liu, U.S. Appl. No. 13/539,421, Office Action dated Jan. 7, 2014.

Chu-heng Liu, U.S. Appl. No. 13/462,485, filed May 2, 2012.

* cited by examiner

SYSTEMS AND METHODS FOR PRINTING DIFFERENTIAL GLOSS IMAGE ON PACKAGING

RELATED APPLICATIONS

This application is related to co-pending U.S. patent application Ser. No. 13/462,485 titled "METHODS AND APPARATUS FOR GENERATING DIFFERENTIAL GLOSS IMAGE USING LASER ENERGY;" co-pending U.S. patent application Ser. No. 13/539,421 titled "METHODS AND SYSTEMS FOR GENERATING DIFFERENTIAL GLOSS IMAGE USEFUL FOR DIGITAL PRINTING;" and co-pending U.S. patent application Ser. No. 13/539,416 titled "METHODS AND SYSTEMS FOR GENERATING DIFFERENTIAL IMAGE BY PRE-HEATING PRINTED IMAGE," the disclosures of which are incorporated by reference herein in their entireties.

FIELD OF DISCLOSURE

The disclosure relates to systems and methods for producing differential gloss images. In particular, the disclosure relates to systems and methods for producing images on a marking material fixed to a substrate on packaging.

BACKGROUND

Digital printing technology accommodates printing variable data on flat sheet substrates. In packaging applications, digital printing processes are used to print images on packaging according to variable image data. For example, inkjet or xerographic printing systems are used to print on foldable cartons and labels. There is a desire, however, to print or mark information on packaging after the packaging is assembled and/or packed and/or applied to an object. For example, there is a desire to print on assembled or packed packages or labels at a point of sale. Related art digital printing options for packaging are limited and are typically costly or produce prints of low quality.

SUMMARY

Methods and apparatus for creating an image by applying energy to marking material on a substrate are disclosed in U.S. patent application Ser. No. 13/462,485 titled "METHODS AND APPARATUS FOR GENERATING DIFFERENTIAL GLOSS IMAGE USING LASER ENERGY." Methods and systems for creating gloss images by applying energy to marking material on a substrate based on variable data are disclosed in U.S. patent application Ser. No. 13/539,421 titled "METHODS AND SYSTEMS FOR GENERATING DIFFERENTIAL GLOSS IMAGE USEFUL FOR DIGITAL PRINTING." Systems and methods for printing a differential gloss image on packaging are provided.

In an embodiment, systems for generating a differential gloss image useful for digital printing on packaging may include a packaging transport configured to transport at least one package; and a laser glossing imager configured to expose a portion of a printed image on the package to radiation.

The laser glossing imager may include a high power laser. In an embodiment, the laser glossing imager may extend a full width of a printed image transported by the packaging transport. In an alternative embodiment, the laser glossing imager may extend a partial width of a printed image disposed on the packaging.

In an embodiment, the packaging transport may be configured to transport the packaging to a position for exposure to radiation from the laser glossing imager. In an embodiment, the laser glossing imager is configured to be adjustable for positioning the imager for firing a laser beam for exposing the portion of the printed image to radiation. In another embodiment, the packaging transport may be configured for adjusting a position of a package carried by the transport to align the package with respect to a position of a laser glossing imager for laser glossing.

In an embodiment, the packaging transport may be a continuous transport configured to transport at least one package to a laser glossing imager for laser glossing at least one side of the at least one package. In an embodiment, the packaging transport may include at least one platform for carrying a packaging substrate, the at least one platform being rotatable for rotating the packaging with respect to a laser glossing imager. In an embodiment, the packaging may comprise a cylindrical container, or may be disposed on a cylindrical container.

In an embodiment, methods of generating a gloss image useful for digital printing on packaging may include transporting a printed image on a packaging substrate to a laser glossing imager; and causing the laser glossing imager to expose at least a portion of the printed image to radiation to alter a surface of the printed image. Methods may include causing an inkjet print engine to form the printed image on the packaging substrate. In an alternative embodiment, methods may include causing a xerographic print engine to form the printed image on the packaging substrate.

Methods may include causing the packaging substrate having the printed image to be positioned for exposing a portion of the printed image to radiation from the laser glossing imager. Methods may include causing the laser glossing imager to fire a laser to expose the printed image to the radiation when the printed image is positioned for exposure, whereby a portion of the printed image is melted.

In an embodiment, methods may include causing the packing substrate having the melted portion of the printed image to be transported away from the laser glossing imager. Methods may include the imaging device comprising a laser glossing imager configured to emit a laser beam at a firing time, the laser beam being configured to melt a portion of a printed image based on the received variable image data.

Methods may include receiving position information at a positioning system from a digital front end; and sending the position information to the imaging device. Methods may include receiving variable image data at a user interface, the user interface being configured to communicate with the digital front end. Methods may include the radiation being configured to cause the portion of the printed image to melt, altering a gloss of the portion of the printed image.

Exemplary embodiments are described herein. It is envisioned, however, that any system that incorporates features of apparatus and systems described herein are encompassed by the scope and spirit of the exemplary embodiments.

DETAILED DESCRIPTION

Figure 1:
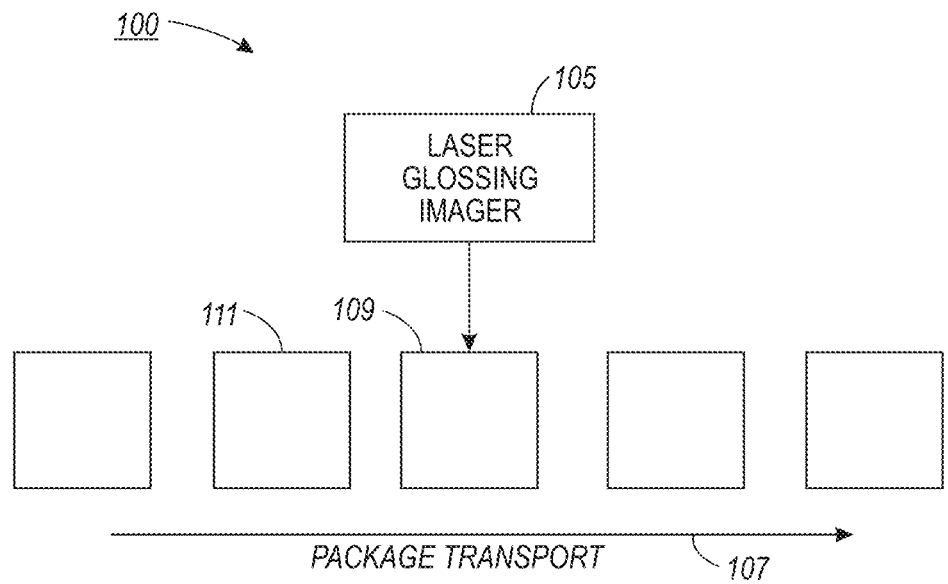
FIG. 1 shows a diagrammatical view of a system for printing a differential gloss image on packaging in accordance with an exemplary embodiment.

Exemplary embodiments are intended to cover all alternatives, modifications, and equivalents as may be included within the spirit and scope of the methods and systems as described herein.

As disclosed in U.S. patent application Ser. No. 13/462,485 titled "METHODS AND APPARATUS FOR GENERATING DIFFERENTIAL GLOSS IMAGE USING LASER ENERGY," methods and systems for using an image production device to generate differential gloss on a printed image may include exposing a printed image such as a toner image or a ink image to radiation emitted by an imaging device, such as a laser glossing imager, to cause one or more portions of the printed image to melt. The marking material image is disposed on a substrate that is configured to remain substantially unaffected by radiation emitted by the high power laser. As disclosed in U.S. patent application Ser. No. 13/539,421 titled "METHODS AND SYSTEMS FOR GENERATING DIFFERENTIAL GLOSS IMAGE USEFUL FOR DIGITAL PRINTING," the one or more portions of the printed image may be selectively exposed to, for example, a laser beam emitted by the imaging device according to variable data. In particular, methods may include receiving data at a digital front end (DFE), and generating a differential gloss image on a toner image based on the received data. Methods are useful for generating differential gloss images in variable data printing, a form of digital printing, including on-demand printing, in which elements such as text, graphics, and images may be changed from one print to the next.

Systems may include an image production device having a gloss image creation section comprising an imaging device including a laser glossing imager. A high power laser of the laser glossing imager disclosed, for example, in the '485 application and the '421 application may be configured to melt one or more portions of a printed image on a substrate. The printed image may be formed of a marking material, and may be a toner image or an ink image produced by an image production section of the image production device. An image production device having a gloss image creation section may receive a substrate having a pre-printed image. Alternatively, the image production device may include an image production section for generating the toner image or ink image that is received for laser glossing by the gloss image creation section. While the substrate remains substantially unaffected by the radiation emitted by the laser glossing imager, the one or more portions of the toner image or ink image are selectively exposed to radiation emitted by the laser glossing imager for causing a surface of the printed image to be altered, thereby generating a differential gloss image.

Systems may be configured to superimpose a gloss image on the printed images based on variable data. For example, systems may include a digital front end (DFE) for communicating data to the image production device for digital printing. Systems may be configured to generate a differential gloss image on a toner image by laser patterning based on the communicated data. Systems are useful for generating differential gloss images in variable data printing, a form of digital printing, including on-demand printing, in which elements such as text, graphics, and images may be changed from one print to the next. Systems are useful for digital offset printing, for example. As disclosed herein, systems and methods are useful for printing on printed images disposed on packaging.

Systems may include a computer-readable medium storing instructions for controlling an image production device to generate a print having differential gloss. The instructions may be configured to cause an imaging device having a laser imager connected to one or more controllers or processors to lase or heat select portions of a toner or ink image on a substrate to melt the select portions of the printed image, e.g., the pigments of the toner image absorbing the laser energy.

A processor may include at least one conventional processor or microprocessor that interprets and executes instructions. Systems may include memory such as random access memory (RAM) or another type of dynamic storage device that stores information and instructions for execution by the processor. The memory may also include a read-only memory (ROM) which may include a conventional ROM device or another type of static storage device that stores static information and instructions for the processor.

A communication interface connected to the imaging device may include any mechanism that facilitates network communication. For example, a communication interface may include a modem. Alternatively, a communication interface may include other mechanisms for assisting in communications with other devices and/or systems.

ROM may include a conventional ROM device or another type of static storage device that stores static information and instructions for the processor. A storage device may augment the ROM and may include any type of storage media, such as, for example, magnetic or optical recording media and its corresponding drive.

A user interface may include one or more conventional mechanisms that permit a user to input information to and interact with the image production device and/or imaging device, such as a keyboard, a display, a mouse, a pen, a voice recognition device, touchpad, buttons, etc., for example. An output section of the image production device may include one or more conventional mechanisms that output image production documents to the user, including output trays, output paths, finishing section, etc., for example.

A gloss image creation section of an image production device may include an imaging device such as a laser imager or laser glossing imager. The laser glossing imager may include a high power laser source that is configured to provide sufficient laser energy to selectively cause portions of an ink or toner image to melt. For this purpose, the laser glossing imager may serve as a heating device. For example, the laser glossing imager may be used to output the laser in a certain pattern. This may cause different levels of roughness on, e.g., the toner image, and therefore affect a gloss appearance. The laser glossing imager may be a separate module, or may be implemented as part of another module or component of an image production device.

A cooling section may be configured to cool the toner or ink printed image after the one or more portions of the printed image begin to melt. Although the cooling section is described as a separate module, the cooling section may be implemented as part of another module or component of the image production device. For some embodiments, the cooling section may be optional because the cooling may occur naturally as the heat diffuses away quickly from the local heating spot. As disclosed in U.S. patent application Ser. No. 13/539,416 titled "METHODS AND SYSTEMS FOR GENERATING DIFFERENTIAL IMAGE BY PRE-HEATING PRINTED IMAGE," systems may include a pre-heating section for pre-heating a printed image before exposing the image to radiation from a laser glossing imager.

The image production device may be caused to operate in response to a processor by executing sequences of instructions contained in a computer-readable medium, such as, for example, memory. Such instructions may be read into memory from another computer-readable medium, such as a storage device or from a separate device by way of a communication interface.

Although not required, the disclosure will be described, at least in part, in the general context of computer-executable instructions, such as program modules, being executed by the image production device, such as a communication server, communications switch, communications router, or general purpose computer, for example.

Generally, program modules include routine programs, objects, components, data structures, etc. that performs particular tasks or implement particular abstract data types. Moreover, those skilled in the art will appreciate that other embodiments of the disclosure may be practiced in communication network environments with many types of communication equipment and computer system configurations, including personal computers, hand-held devices, multi-processor systems, microprocessor-based or programmable consumer electronics, and the like.

An imaging device such as a laser glossing imager may be applied using a combination of a beam and an x-y table. Alternatively, a line exposure of laser may be created in one direction while the substrate may travel in a different direction such as, for example, a direction perpendicular to a toner image and substrate process direction.

A laser glossing imager may be configured so that the power of the laser energy emitted from the laser glossing imager is sufficient enough to cause melting of the toner image, while being insufficient to cause evaporation or ablation of the toner image or the substrate. For example, the laser glossing imager may be configured to meet energy requirements of about 1 kW/cm2 (or in a range of 100 to 10000 W/cm2) for power density, and about 1 J/cm2 (or in a range of 0.1 to 10 J/cm2) for energy density. The energy requirements for a laser glossing imager differs from the energy requirements typically associated with laser ablation/engraving techniques where the laser energy is strong enough to be used in etching application of hard materials (e.g., stone, ceramic, etc.). For example, the typical laser energy requirements for laser ablation/engraving may be in a range of 1 to 100 MW/cm2 for power density, and a range of 1 to 100 J/cm2 for energy density, where MW is Mega Watts. In addition, the laser ablation/engraving techniques may cause evaporation or removal of the material, whereas there is minimal or no evaporation or removal of the material caused by the embodiments of the present invention. A laser glossing imager has energy requirements that also differ from that of lower-power laser imagers typically used for electrophotography, as in a laser printer. Laser glossing of existing printed images using a high power laser imager alters surface roughness of the printed image to produce gloss image with high resolution and strong contrast.

Conventional digital package printing includes generating a printed image with digital technology on packaging material that is arranged in sheet form. After printing, packaging material is applied to an object surface folded or assembled to form a 3-dimensional package, or is applied to an object surface. For example, the packaging material may be a label that is applied with adhesive to a surface of a can.

Systems and methods of embodiments included generating a differential gloss image by laser glossing an ink or toner image printed on packaging material. The packaging material may be in unassembled form, or may be assembled or applied to a product before laser glossing the printed image. The object surface may be flat, curved, or even concave. In particular, the printed image is laser glossed by exposing the printed image to radiation emitted by high power laser of a laser glossing imager, forming a differential gloss image on the printed image.

Laser glossing may be used to mark or image xerographic or solid ink prints on packaging to produce high contrast, high resolution differential gloss images. Laser glossing may be used for security printing and graphics enhancement. For example, laser glossing may be used to apply markings to packaging that may be implemented for product authentication systems.

Laser power has a projective (non-contact) nature: energy may be delivered to a localized or focused region on a substrate from a significant distance from a laser imager. Additionally, the field of depth may be large, which reduces a need for fine control over a gap distance between the laser glossing imager and the substrate. For example, laser glossing imager can be arranged to have a gap distance of several centimeters between the substrate and an imaging/focal plane of the imager. A field of depth may be several millimeters. Optimally, object distance and field of depth may be adjusted, e.g., increased significantly, if desired.

Laser glossing may be used to print variable image data on packaging directly. Due to the non-contact and projective nature of radiation emitted by laser glossing imagers having high power lasers, laser glossing may be implemented with a laser imager that is positioned physically far away from an imaging surface of an object, which accommodates greater design latitude. An object surface may be exposed to laser power in an image-wise fashion from various orientations and angles. Printed packaging substrates suitable for laser glossing include flat, curved, embossed, or concave surfaces. Methods may include printing on the packaging substrate with a suitable ink or toner at a targeted area for laser glossing. Examples of suitable technologies performing the printed image include xerographic printing and solid ink jet printing. A packaging substrate having a printed image may be assembled or applied to an object before or after the laser glossing or exposing of the printed image to radiation from a laser glossing imager.

In particular, a printed image formed on the packaging sheet material by the solid ink jet or xerographic printing system may be transported by a packaging transport to a laser glossing imager. The printed image on the packaging material may be aligned with respect to the laser glossing imager. Alignment may be carried out by one or both of adjusting the packaging transport or adjusting a position of one or more laser glossing imagers. For example, in an embodiment, the laser glossing imager may be configured for adjusting a position of the imager with respect to the packaging substrate and/or the packaging transport system. Alignment of the packaging substrate and/or laser glossing imager may be carried out based on variable data. Methods may include laser glossing, one or more select portions of the printed image on the packaging substrate. The laser glossing may be carried out in accordance with variable image data.

FIG. 1 shows a system for generating a differential gloss image directly on a packaging substrate in accordance with exemplary embodiment. In particular, FIG. 1 shows a laser glossing system 100. The laser glossing system 100 includes a laser glossing imager 105. The laser glossing imager 105 includes a high power laser configured to emit radiation for altering a surface of a printed image formed of, for example, toner or ink.

System 100 may include a package transport 107. The package transport may include components now known or later developed suitable for carrying a package or plurality of packages from one point to another. In particular, the package transport 107 may be configured to carry one or more packages to pass one or more laser glossing imagers. The package transport 107 may be arranged about a transport path. The laser glossing imager 105 may be one of a single or plurality of laser glossing imagers disposed about the transport path of the package transport 107.

The package transport 107 may be configured to carry one or more packaging substrates 109 and 111. FIG. 1 shows a first packaging substrate 109 positioned to accommodate exposure of a printed image on the substrate to radiation emitted by the laser glossing imager 105. FIG. 1 also shows a second packaging substrate 111 arranged at a position on the package transport 107 following the first packaging substrate 109. In an embodiment, the package transport 107 and/or laser glossing imager 105 may be positioned to expose a printed image on the packaging substrate surface(s) from a top, bottom, or side with the respect to the package carried by the package transport 107.

FIG. 1 shows the laser glossing imager 105 positioned to expose a top of a package carried by the package transport 107 to radiation. In an embodiment, the laser glossing imager 105 may be configured for adjustable positioning, and may be configured to strike a package surface from more than one position, or to strike different package surface from different respective positions. For example, one or more laser glossing imagers 105 may be arranged for striking a package surface at desired sides of the package. A cluster of laser glossing imagers may be used, or alternatively, the laser glossing imager 105 may be positioned to move about the packaging substrate 109, for example, to expose different sides of the packaging substrate 109 to radiation from the laser glossing imager 105.

Figure 2:
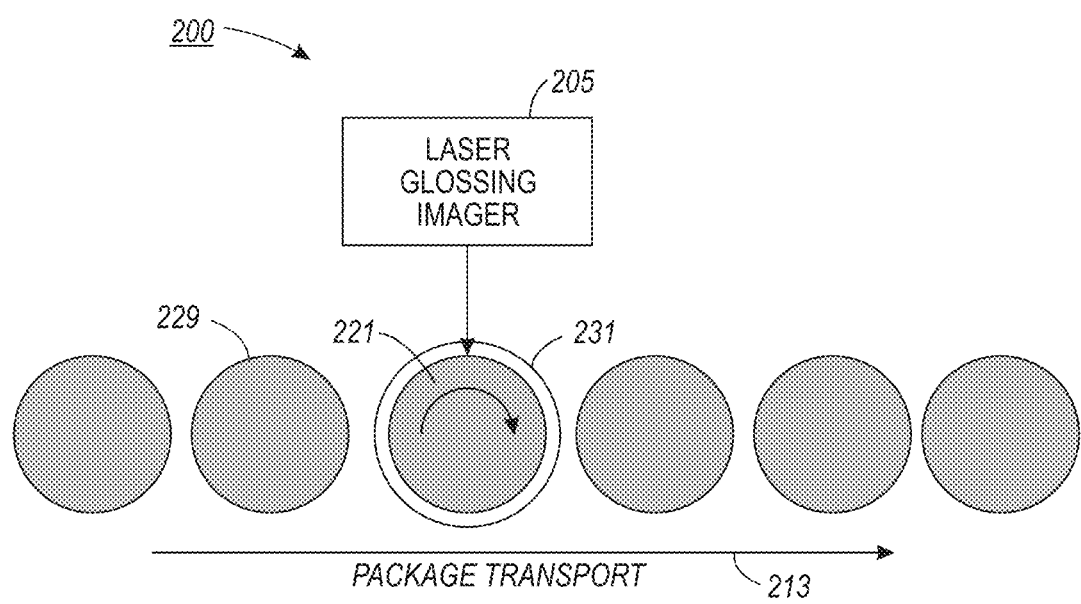
FIG. 2 shows a diagrammatical view of a system for printing a differential gloss image on packaging in accordance with an exemplary embodiment.

FIG. 2 shows systems for generating a differential gloss image on a printed image on a packaging substrate in accordance with another embodiment. In particular, FIG. 2 shows a laser glossing system 200. The laser glossing system 200 includes a laser glossing imager 205. The laser glossing imager 205 may include a high power laser configured to alter a surface of the printed image formed of ink or toner. The system 200 includes a package transport 213. The package transport 213 may be configured to carry one or more packages such as packaging substrates 221 and 229 shown in FIG. 2.

FIG. 2 shows the first packaging substrate 221 located at a position on the package transport adjacent to the laser glossing imager 205. A second packaging substrate 229 is located at a position that follows the position of the first packaging substrate 221, with respect to a process direction. The package transport 213 includes a packaging support comprising one or more turntables 231. FIG. 2 shows the turntable 231 forming a packaging support to support the first packaging substrate 221. The turntable may be rotatable in the direction of the depicted arrow. For example, the turntable 231 may be rotatable to cause positioning of the first packaging substrate 221 to accommodate exposure of more than one portion of the first packaging substrate 221 to radiation emitted by the laser glossing imager 205.

FIG. 2 shows the first packaging substrate 221 being a cylindrical object. Systems may include the package transport 213 being configured to transport a first packaging substrate 221 to a position for exposure to radiation emitted by a laser glossing imager 205. After laser glossing a printed image disposed on the first packaging substrate 221, the package transport 213 may be configured to then transport the first packaging substrate 221 away from the laser glossing imager 205. The packaging transport 213 may be configured to then convey the second packaging substrate 229 to a position adjacent to the laser glossing imager 205 for exposure to radiation emitted by the laser glossing imager 205. After laser glossing a printed image disposed on the second packaging substrate 229, the package transport 213 may be configured to convey the second packaging substrate 229 away from the laser glossing imager.

The first packaging substrate 221 and/or second packaging substrate 229 may be disposed on a platform such as a turntable 231 connected to the package transport 213. The turntable 231 may be configured for positioning a packaging substrate with respect to a laser glossing imager such as laser glossing imager 205. For example, the platform shown in FIG. 2 is a turntable 231 that is configured to rotate in a direction corresponding to the depicted arrow. The packaging substrate may be located on or may form a cylindrical surface. For example, the packaging substrate may be a label on a can or drum that includes a printed ink or toner image disposed thereon.

Laser exposure may be carried out on the cylindrical surface while the turntable 231 advances the surface of the packaging substrate then located at the position of the turntable 231 disposed an operable distance from a one or more laser glossing imagers such as the laser glossing imager 205. Alternatively, the packaging transport 213 may be configured so that a packaging substrate is stationary during exposure to radiation from the laser glossing imager 205, while the laser glossing imager 205 is configured to move around the curved surface of, for example, the first packaging substrate 221 for laser imaging. Alternatively, a plurality of laser glossing imagers configured for exposing various sides or surfaces of a packaging substrate may be used to laser gloss a printed toner or ink image on a packaging substrate.

Figure 3:
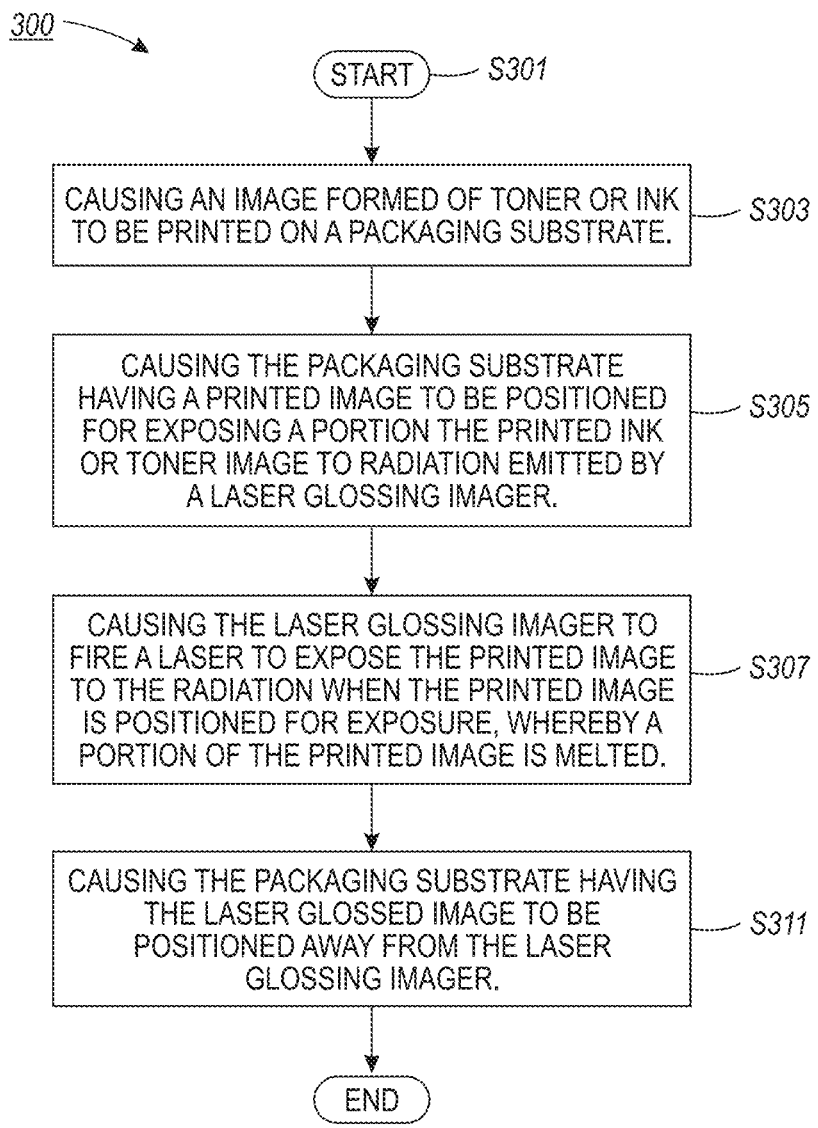
FIG. 3 shows methods for generating a differential gloss image on packaging in accordance with an exemplary embodiment.

FIG. 3 shows methods for generating a differential gloss image directly on a packaging substrates having a printed toner or ink image. In particular, FIG. 3 shows a differential gloss image forming process 300 that starts at S301. Methods may include causing an image formed of toner or ink to be printed on a packaging substrate at S303. The printed image may be formed by a xerographic toner image printing system or an ink jet solid ink printing system.

Methods may include causing the packaging substrate having a printed image to be positioned for exposing a portion of the printed ink or toner image to radiation emitted by a laser glossing imager at S305. The laser glossing imager may include a high power laser configured to expose desired portions of the printed image to radiation sufficient to melt a surface of the printed image for forming a differential gloss image. The laser glossing may be carried out according to variable data including substrate/imager positioning data and/or image data.

Methods may include causing a laser glossing imager to fire a laser to expose the printed image to the radiation when the printed image is positioned for exposure, whereby a portion of the printed image is melted at S307. The packaging substrate may be aligned with respect to the laser glossing imager by now known or later developed components of a packaging transport configured to transport one or more packaging substrates to pass one or more laser glossing imagers.

Methods may include causing the packaging substrate having the laser glossed image be positioned away from the laser glossing imager at S311. After forming a differential gloss image on the one or more portions of the printed image on the packaging substrate, packaging substrate may be moved away from the laser glossing imager so that subsequent packaging substrates carried by the packaging transport may be positioned for laser glossing by the laser glossing imager.

Figure 4:
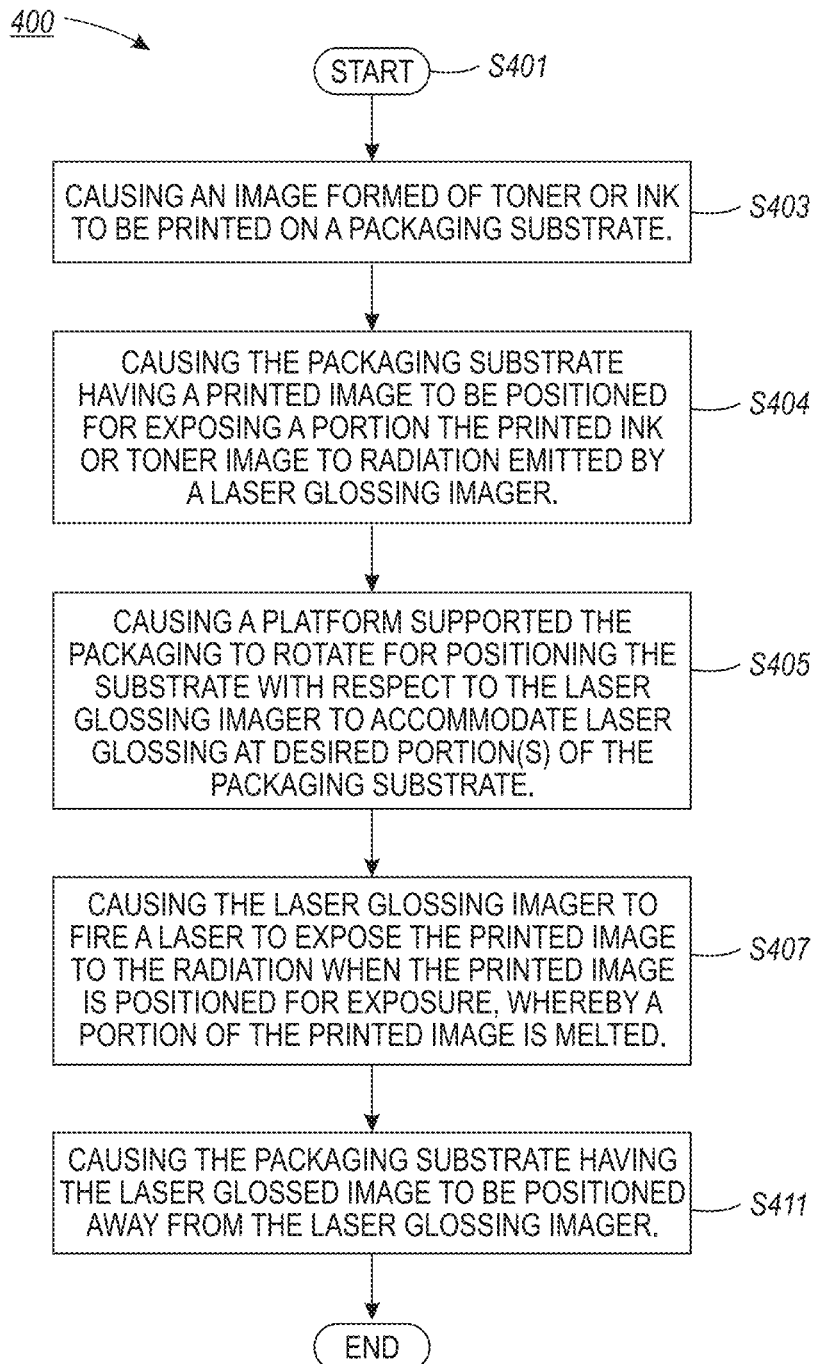
FIG. 4 shows methods for generating a differential gloss image on packaging in accordance with an exemplary embodiment.

FIG. 4 shows a method for generating differential gloss images directly on packaging substrates 400 that starts at S401. Methods may include causing an image formed with toner or ink to be printed on a packaging substrate at S403. The image may be formed by a xerographic toner or an ink jet solid ink printing system.

Methods may include causing the packaging substrate having the printed image to be positioned for exposing a portion of the printed image or toner to radiation emitted by the laser glossing imager as S404. In addition, the laser glossing imager may be adjusted with respect to the packaging substrate carried by a packaging transport. The packaging substrate may be aligned with respect to the laser glossing imager by adjusting the laser glossing imager and/or the packaging transport.

Methods may include causing a platform supporting the packaging to rotate for positioning the packaging substrate with respect to the laser glossing imager at S405. For example, a packaging substrate may be a printed label arranged on a cylindrical object. The cylindrical object may be rotated by way of the rotatable platform while the laser glossing imager exposes the printed image on the label to radiation for forming one or more differential gloss images around a circumferential surface of the packaging substrate.

Methods may include causing the laser glossing imager to fire a laser to expose the printed image to radiation when the printed image is positioned for exposure, whereby a portion of the printed image is melted at S407. The packaging substrate may be rotated at S405 before and/or after causing the laser glossing imager to fire a laser to expose the printed image on the packaging substrate surface.

Methods may include causing the packaging substrate having the laser glossed image to be positioned away from the laser glossing imager at S411. In particular, the packaging substrate having the laser glossed image may be positioned away from the laser glossing imager by way of the packaging transport so that subsequent packages carried by the package transport may be positioned for exposure to radiation by the laser glossing imager.

Systems may include or may be connected to processors, controllers, memory modules, etc., for implementation of system and methods, remote or otherwise. Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art.

What is claimed is:

1. A system for generating a differential gloss image useful for digital printing on packaging, comprising:
    a packaging transport configured to transport at least one package; and
    a laser glossing imager, the imager being configured to expose a portion of a printed image to radiation using a high power laser to mark the printed image, the printed image being disposed on the packaging, wherein the packaging transport includes at least one platform for carrying a packaging substrate, the at least one platform being rotatable for rotating the packaging with respect to a laser glossing imager.

2. The system of claim 1, the laser glossing imager extending a full width of a printed image transported by the packaging transport.

3. The system of claim 1, the laser glossing imager extending a partial width of a printed image disposed on the packaging.

4. The system of claim 1, wherein the media transport is configured to transport the packaging to a position for exposure to radiation from the laser glossing imager.

5. The system of claim 1, wherein the laser glossing imager is configured to be adjustable for positioning the imager for firing a laser beam for exposing the portion of the printed image to radiation.

6. The system of claim 1, wherein the packaging transport is configured for adjusting a position of the a package carried by the transport to align the package with respect to a position of a laser glossing imager for laser glossing.

7. The system of claim 1, wherein the packaging transport is a continuous transport configured to transport at least one package to a laser glossing imager for laser glossing at least one side of the at least one package.

8. The system of claim 1, the packaging comprising a cylindrical container.

9. A method of generating a gloss image useful for digital printing on packaging, comprising:
    transporting a printed image on a packaging substrate on a packaging transport to a laser glossing imager;
    causing the laser glossing imager to expose at least a portion of the printed image to radiation to alter a surface of the printed image, the radiation being produced by a high power laser; and causing an inkjet print engine to form the printed image on the packaging substrate, wherein the packaging transport includes at least one platform for carrying the packaging substrate, the at least one platform being rotatable for rotating the packaging with respect to the laser glossing imager.

10. The method of claim 9, the printed image comprising toner, the method comprising:

causing a xerographic print engine to form the printed image on the packaging substrate.

11. The method of claim 9, comprising:

causing the packaging substrate having the printed image to be positioned for exposing a portion of the printed image to radiation from the laser glossing imager.

12. The method of claim 11, the exposing further comprising:

causing the laser glossing imager to fire a laser to expose the printed image to the radiation when the printed image is positioned for exposure, whereby a portion of the printed image is melted.

13. The method of claim 12, comprising:

causing the packing substrate having the melted portion of the printed image to be transported away from the laser glossing imager.

14. The method of claim 9, wherein the laser glossing imager emits a laser beam at a firing time, the laser beam melting a portion of a printed image based on received variable image data from the laser glossing imager.

15. The method of claim 9, comprising:

receiving position information at a positioning system; and
sending the position information to the laser glossing imager.

16. The method of claim 9, comprising:

receiving variable image data at a user interface.

17. The method of claim 9, whereby the radiation causes the portion of the printed image to melt, altering a gloss of the portion of the printed image.

18. A system for generating a differential gloss image useful for digital printing on packaging, comprising:

an inkjet print engine;

a packaging transport configured to transport at least one package on a packaging transport; and a laser glossing imager, the imager being configured to expose a portion of a printed image to radiation using a high power laser to mark the printed image, the printed image being disposed on the packaging, wherein the packaging transport includes at least one platform for carrying the packaging substrate, the at least one platform being rotatable for rotating the packaging with respect to the laser glossing imager.

* * * * *